United States Patent [19]

Crankshaw et al.

[11] Patent Number: 4,566,933

[45] Date of Patent: Jan. 28, 1986

[54] LABEL APPLICATOR FOR MULTIPLE PANEL WRAPPING

[75] Inventors: Michael Crankshaw, Santa Fe Springs; George A. Allen, Irvine, both of Calif.

[73] Assignee: Label-Aire Inc., Fullerton, Calif.

[21] Appl. No.: 613,865

[22] Filed: May 23, 1984

[51] Int. Cl.$^4$ .......................... B65C 9/28; B32B 31/00; B65H 26/00; B44C 1/00

[52] U.S. Cl. .................................... 156/444; 156/481; 156/482; 156/539; 156/542; 156/361; 156/240; 156/DIG. 26; 156/DIG. 38

[58] Field of Search ............... 156/493, 444, 468, 215, 156/285, 497, DIG. 11, DIG. 13, DIG. 26, DIG. 38, DIG. 42, DIG. 31, DIG. 33, 542, 361, 240, 539, 482, 481, 541, 488, 480, 356; 221/98, 73; 271/98, 195, 197

[56] References Cited

U.S. PATENT DOCUMENTS

| | | | |
|---|---|---|---|
| Re. 30,419 | 10/1980 | Crankshaw et al. | 156/DIG. 33 |
| 2,873,040 | 2/1959 | Manas | 156/493 |
| 3,188,261 | 6/1965 | Lagsdin | 156/493 |
| 3,859,155 | 1/1975 | Dullinger | 156/444 |
| 3,944,455 | 3/1976 | French | 156/361 |
| 4,124,429 | 11/1978 | Crankshaw | 156/542 |
| 4,201,621 | 5/1980 | Crankshaw | 156/542 |
| 4,265,695 | 5/1981 | Hurley et al. | 156/285 |
| 4,314,869 | 2/1982 | Crankshaw | 156/DIG. 26 |

FOREIGN PATENT DOCUMENTS

| | | | |
|---|---|---|---|
| 2257890 | 5/1974 | Fed. Rep. of Germany | 156/493 |

*Primary Examiner*—Edward Kimlin
*Assistant Examiner*—Louis Falasco
*Attorney, Agent, or Firm*—Gordon L. Peterson

[57] ABSTRACT

A label applicator for labeling articles moving along a path which includes a label retaining device for retaining labels at a label retaining station, a label dispenser for dispensing labels onto the label retaining device, a rotatable wheel for use in orienting articles at the label retaining station, a label transfer device for blowing a leading portion of the label on the label retaining means onto an article at the label retaining station while allowing a trailing portion of the label to remain on the label retaining device so that movement of the article past the label retaining station pulls the trailing portion of the label from the label retaining device, and a label wrap device downstream of the label retaining station for applying the trailing portion of the label to the article.

14 Claims, 4 Drawing Figures

LABEL APPLICATOR FOR MULTIPLE PANEL WRAPPING

BACKGROUND OF THE INVENTION

It is sometimes necessary to apply a relatively long label to the periphery of an article such that the label covers more than one face or side of the article. It is common practice to apply long labels of this type to cylindrical articles using wrap around labeling techniques. A wrap around label applicator is shown, by way of example, in Crankshaw U.S. Pat. No. 4,124,429.

One problem in applying long labels to the peripheral or side wall of an article is in properly orienting the article with respect to the label. If the article and label are slightly angularly misaligned at the leading edge of the label, the trailing portion of the label will be displaced substantially from its desired location on the article. This kind of labeling is even more difficult when the peripheral wall of the article is noncylindrical or irregular in shape.

Crankshaw et al. U.S. Pat. No. 4,201,621 shows a device for accurately orienting irregularly shaped articles with respect to a label applicator. The label applicator applies the label to the article while the article is held in a predetermined orientation. This patented construction functions extremely well; however, as disclosed in the patent, only relatively small labels are applied to a single side or panel of the article to be labeled. Thus, this patent does not disclose how to utilize the article orienting device in a way to permit long labels to be applied to two or more sides or panels of the article.

SUMMARY OF THE INVENTION

This invention provides a label applicator which accurately applies long labels to the peripheral wall of articles. The long labels may cover any number of panels of the article, and the articles to be labeled may have a peripheral wall of cylindrical or noncylindrical configuration. As used herein, a panel of an article to be labeled means a side or face of the peripheral wall.

The label applicator of this invention can advantageously include means for releasably retaining a label at a label retaining station and label dispensing means for dispensing labels onto the label retaining means. To orient the article to be labeled, the label applicator includes a rotatable wheel having a peripheral surface, at least a portion of which is resiliently deformable, and guide means adjacent the peripheral surface of the wheel for urging an article against the peripheral surface to resiliently deform the peripheral surface sufficiently to hold the article in a desired orientation at the label retaining station.

A leading portion of the label on the label retaining means is blown onto the article while the article is held in the desired orientation. A trailing portion of the label remains retained on the label retaining means. Accordingly, movement of the article past the label retaining station pulls the trailing portion of the label from the label retaining means. Means downstream of the label retaining station applies the trailing portion of the label to the article. Preferably, such means rotates the article.

Because the label is to be applied to more than one panel of the article and only one panel can face the label retaining means, only the leading portion of the label is blown onto the article. The trailing portion of the label, which is to be applied to other panels of the article, is first pulled from the label retaining means by movement of the article and applied to the article downstream of the label retaining station.

The label retaining means preferably includes a perforate face and means for releasably retaining the label against the perforate face by differential fluid pressure. The perforate face has a leading portion through which air can be supplied under pressure to blow the leading portion of the label onto the article and a trailing portion for releasably retaining a trailing portion of the label. To prevent blowing portions of the label against the resilient wheel, it is necessary that the air blast be of relatively short duration. However, there is danger that the re-establishment of the vacuum pressure at the leading portion of the face would seal off the perforations within the leading portion of the face, in which event, the label might be so securely coupled to the leading and trailing portions of the face that it would hold the label and the article against movement. To avoid this problem, the leading portion of the face is preferably concave. This spaces the leading portion of the face sufficiently from the leading portion of the label and provides end openings for this space so that the return of vacuum pressure to the leading portion of the face cannot result in label and article retention.

The leading and trailing portions of the perforate face function differently as described above. Although these different functions could be embodied in a single unitary, perforate face, it is preferred to utilize leading and trailing enclosures having leading and trailing perforate face sections, respectively. One advantage of the dual enclosures is that the trailing enclosure can be a standard vacuum box of the type used commonly in other label applicators for label retention. The leading enclosure can be smaller than the trailing enclosure and is the only enclosure which needs to be provided with means for blowing air for label transfer purposes. In a preferred implementation, the leading enclosure is partly received in an opening in the guide means which cooperates with the wheel, and the leading face section is shorter in the general direction of movement of the articles than the trailing face section.

Although the wheel and guide means can be used to orient articles having a peripheral wall of cylindrical or noncylindrical configuration, they are of particular advantage in orienting articles having a peripheral wall of noncylindrical configuration. Accordingly, the wheel and guide can be eliminated, if desired, when cylindrical articles are to be labeled. The other features of this invention are particularly applicable to the multiple panel labeling of articles having a noncylindrical peripheral wall, although these features can also be employed for the labeling of cylindrical articles.

The invention, together with additional features and advantages thereof, may best be understood by reference to the following description taken in connection with the accompanying illustrative drawing.

DESCRIPTION OF THE PREFERRED EMBODIMENT

Figure 1:
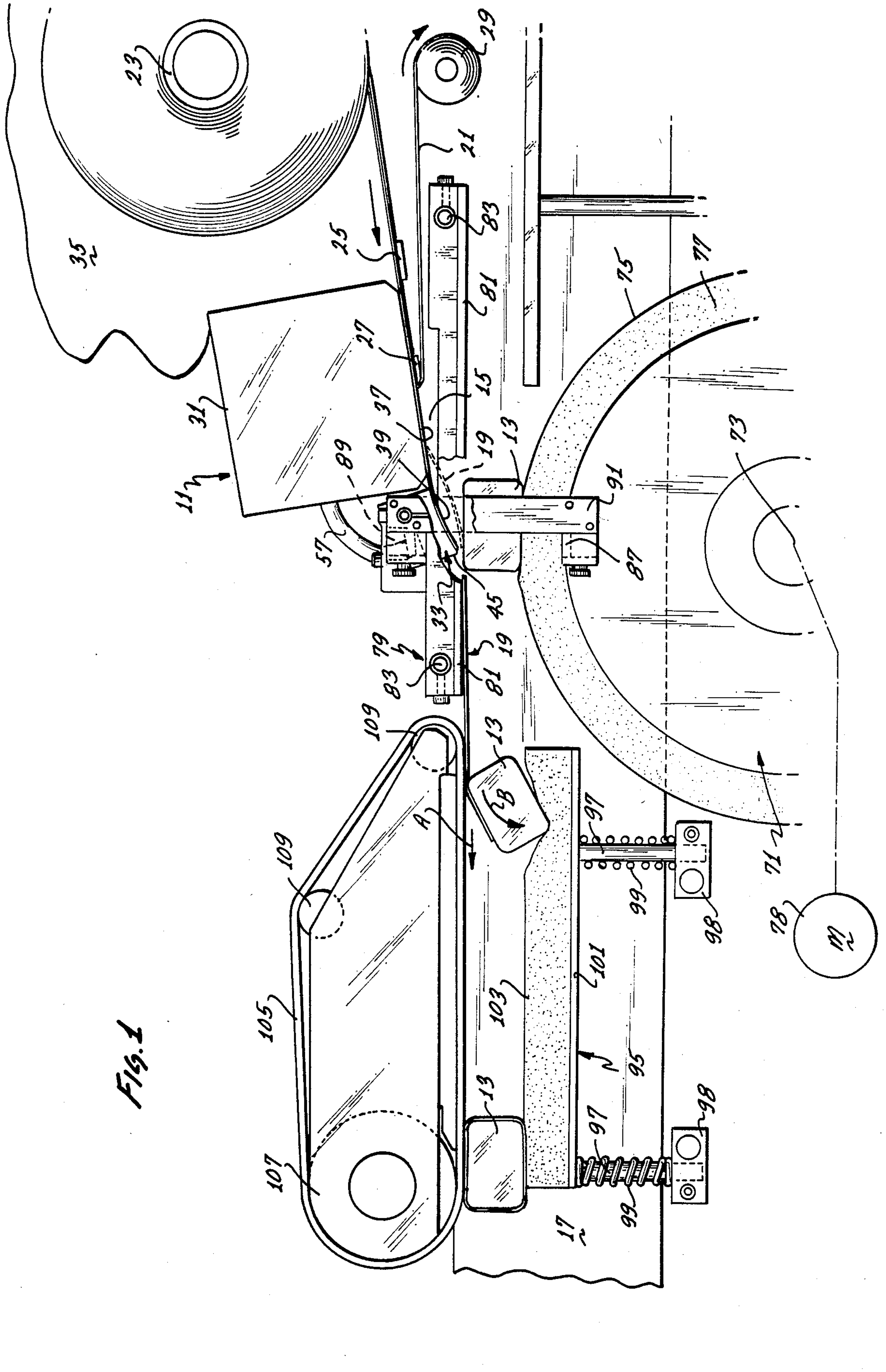
FIG. 1 is a fragmentary top plan view of a label applicator constructed in accordance with the teachings of this invention.

FIG. 1 shows a label applicator 11 for applying labels to articles 13 which are moved along a horizontal path past a label retaining station 15 by any suitable means, such as a conveyor 17. Although the label applicator 11 may use various different kinds of label dispensing means, in the embodiment illustrated, labels 19 are releasably adhered to an elongated backing strip or web 21 by a pressure sensitive adhesive. The web 21 is wound on a supply reel 23 and passes over rollers (not shown), peeling bars 25 and 27 to a take-up reel 29. In passing over the peeling bar 27, the web 21 is folded into a reverse bend, and the label 19 is separated from the web. The movement of the web 21 over the peeling bar 27 is controlled in a conventional manner, and the peeling bar 25 is used to contain a portion of the sensing apparatus which controls movement of the backing strip.

Figure 4:
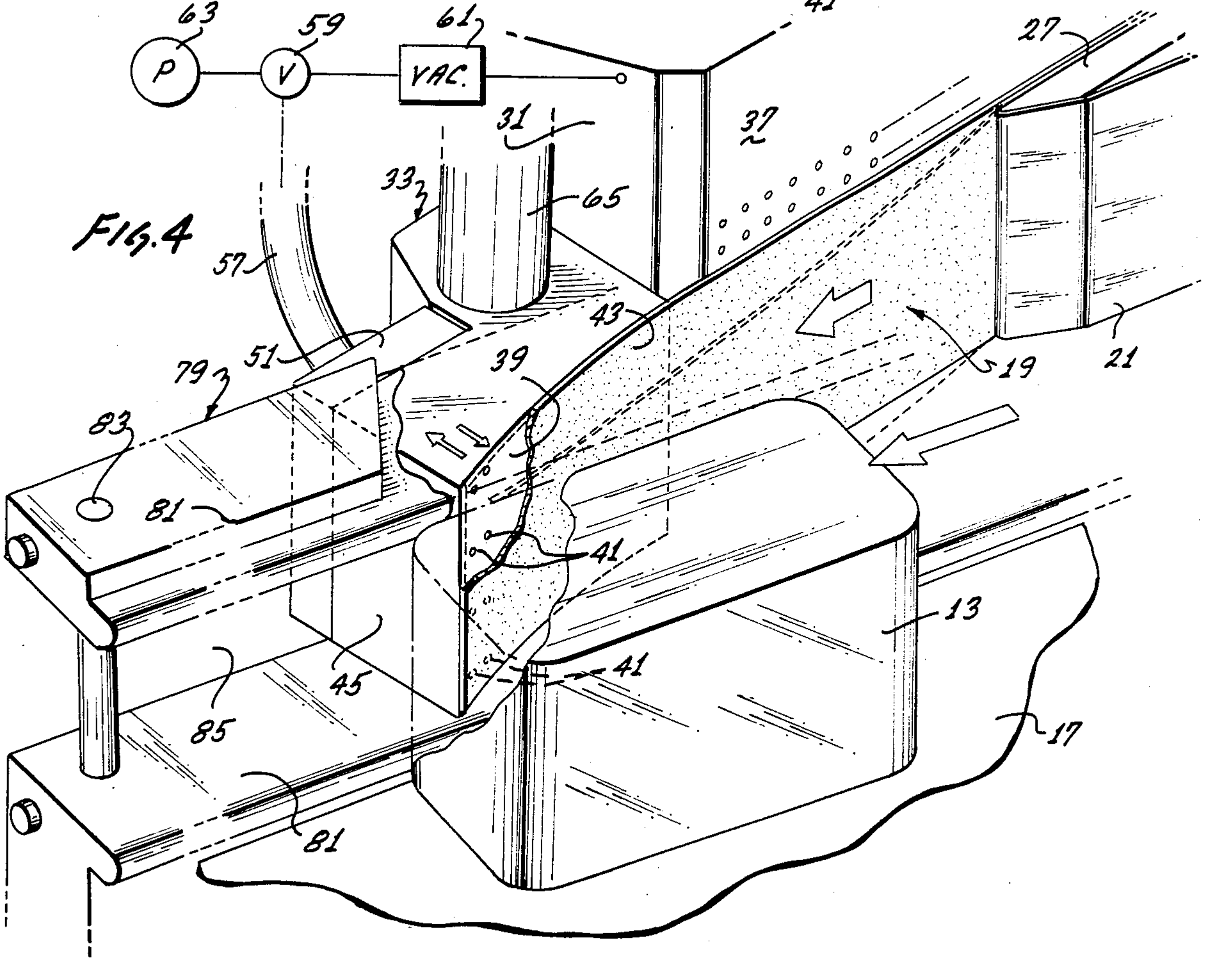
FIG. 4 is a fragmentary isometric view illustrating the structure of the label applicator adjacent the label applying station.

The label 19 removed from the web 21 is releasably retained at the label retaining station 15 by label retaining means which, in the embodiment illustrated, includes a trailing enclosure 31 and a leading enclosure 33 suitably mounted along with the supply reel 23, the peeling bars 25 and 27 and the take-up reel 29 on supporting structure 35 of the label applicator. The trailing enclosure 31 is preferably a conventional vacuum box having a trailing perforate face section 37 (FIG. 4).

Figure 2:
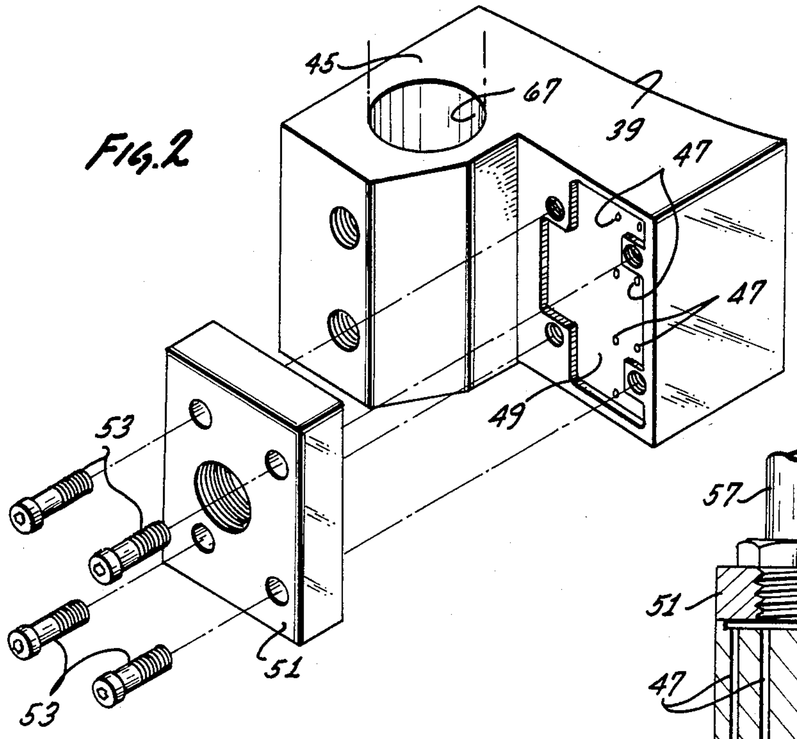
FIG. 2 is an exploded isometric view of the leading enclosure.
Figure 3:
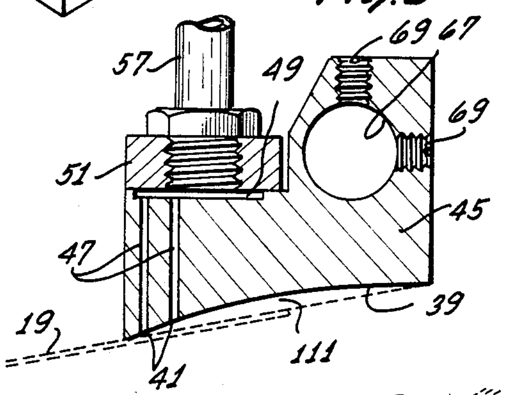
FIG. 3 is a sectional view of the leading enclosure illustrating how the concave face section thereof is not sealed off by the label.

The leading enclosure 33 may be of various different constructions which can provide it with a leading perforate face section 39 (FIG. 4) having openings 41 which can alternately be supplied with air at vacuum pressure to assist in releasably retaining the label 19 or air under a positive pressure for transferring a leading portion 43 of the label 19 to the article 13 at the label retaining station 15. In the embodiment illustrated, the leading enclosure 33 includes a main body 45 (FIGS. 2 and 3) having the leading face section 39 thereon and passages 47 extending through the body from a chamber 49 formed between the body and a cover plate 51 and the openings 41. As best seen in FIG. 3, the face section 39 is concave. The cover plate 51 is releasably attached to the main body 45 in any suitable way, such as by threaded fasteners 53. A threaded opening 55 in the cover plate 51 enables the chamber 49 to be coupled via a conduit 57 through a control valve 59 to a source of vacuum pressure 61 and a source of air under pressure 63. The source of vacuum pressure 61 is also coupled to the trailing enclosure 31.

The leading enclosure 33 can be mounted on a post 65, which forms a portion of the supporting structure 35, by extending the post 65 through a bore 67 of the body 45. The angular and axial positions of the leading enclosure 33 about and along the post 65 can be adjusted, and the leading enclosure can be fixed in position by set screws 69 (FIG. 3).

To orient the articles 13, the label applicator 11 includes a wheel 71 rotatably mounted on the supporting structure 35 for rotational movement about a vertical rotational axis 73 (FIG. 1). The wheel 71 has a cylindrical peripheral surface 75, and at least an outer annular region 77 of the wheel is soft, flexible and resiliently deformable. For example, the wheel 71 may be constructed in the same manner as the corresponding wheel of Crankshaw U.S. Pat. No. 4,201,621. The wheel 71 is rotated counterclockwise as viewed in FIG. 1 by a motor 78.

The wheel 71 cooperates with guide means to hold the article 13 at the label retaining station 15 in a desired orientation. Although the guide means can be of different constructions, in the embodiment illustrated, it comprises a guide 79 (FIGS. 1 and 4) which includes linear guide bars 81 rigidly joined together by posts 83 along one edge of the conveyor 17 and having an opening in the form of an elongated slot 85 between them. The upper guide bar 81 is shown broken away in FIG. 4 to expose the enclosure 33, and a portion of the outline of the guide bar is shown in dashed lines. As shown in FIG. 4, the portion of the leading enclosure 33 and the leading face section 39 are received within the slot 85. The presence of the article 13 at the label retaining station 15 is sensed in a conventional manner by the article interrupting a beam of light from a source 87 directed toward photocell 89. The source 87 and the photocell 89 are suitably mounted on the supporting structure by a bracket 91 in any suitable manner.

In the embodiment illustrated, the label applicator 11 also includes a wrap around apparatus 93, which may be of conventional construction. The wrap around apparatus 93 includes a rail 95 mounted for movement on posts 97 which are in turn suitably mounted on brackets 98 of the supporting structure 35. The rail 95 is resiliently urged toward the articles 13 by springs 99 on the posts 97, respectively. The rail 95 comprises a rigid member 101, and a resilient cushion of suitable resilient foam 103 carried by the rigid member and facing the articles 13.

The wrap around apparatus 93 also includes an endless belt 105 mounted on a drive pulley 107 and idler pulleys 109. Thus, the belt 105 can be driven in the direction of the arrow "A" in FIG. 1. Also as shown in FIG. 1, the cushion 103 and the belt 105 are spaced apart sufficiently to accommodate passage of the articles 13 between them.

In use, the conveyor 17 moves the articles 13 in the direction of the arrow "A" in FIG. 1, and a label 19, which has been removed from the backing strip 21 by the peeler bar 27, is releasably retained due to differential pressure against the face sections 37 and 39 which combine to form a perforate face. When retained in this manner, the leading portion 43 of the label 19 is retained against the leading face section 39, and a trailing portion 110 of the label is retained against the trailing face section 37 by differential fluid pressure. The wheel 71 is continuously rotated counterclockwise by the motor 78 to give it a tangential velocity approximately equal to the velocity of the articles 13 which are continuously moved past the label retaining station 15 by the conveyor 17.

As one of the articles 13 nears the label retaining station 15, the bars 81 urge the article against the peripheral surface 75 to deform the peripheral surface and the annular region 77 sufficiently to hold the article 13 in a desired orientation. When the leading edge of the article 13 at the label retaining station 15 is sensed by the photocell 89, the valve 59 is switched from the source of vacuum 61 to the source of air under pressure 63 to provide a short duration blast of air under pressure through the conduit 57 and the openings 41 of the leading enclosure 33. Vacuum pressure is continuously applied from the source of vacuum 61 to the trailing enclosure 31. Accordingly, the leading portion 43 of the label is blown from the leading face 39 against the confronting panel of the article 13 while the subatmospheric pressure continues to retain the trailing portion 110 of the label 19 against the trailing face section 37.

The article 13 moves continuously with the conveyor 17, and as a result, pulls the label 19 from the trailing face section 37. The article 13 with the label 19 attached to only one face thereof proceeds to the wrap around apparatus 93 which rotates the article 13 in the direction of the arrow "B" in accordance with known wrap around techniques to apply the trailing portion 110 of the label to the other panels of the article. In the embodiment illustrated, the articles 13 have a generally rectangular peripheral wall, and the label 19 is applied to four sides or panels of the rectangular peripheral wall. Because the article 13 is accurately held at a desired orientation at the label retaining station, the leading portion 43 of the label is accurately attached to the confronting panel of the article.

The blast of air from the leading enclosure 39 must be of short duration, otherwise, as the article 13 moved along the conveyor 17, the label 19 might be blown against the wheel 71. Accordingly, the vacuum must return to the openings 41 rather quickly. FIG. 3 illustrates how the concave face section 39 provides a gap 111 between the label 19 and the openings 41, with the opposite ends of this gap being open. Accordingly, the vacuum is unable to suck the label 19 against the face 39 so as to prevent the article 13 from pulling the label 19 completely off of the face sections 37 and 39. In the embodiment illustrated, the concave face section 39 is curved; however, the concave configuration could be formed by any desired number of curved and/or flat sections.

Although exemplary embodiments of the invention have been shown and described, many changes, modifications and substitutions may be made by one having ordinary skill in the art without necessarily departing from the spirit and scope of this invention.

We claim:

1. A label applicator for labeling articles moving along a path, said label applicator comprising:

means for releasably retaining a label at a label retaining station with the label being pullable along the retaining means;

label dispensing means for dispensing labels onto the label retaining means;

a wheel having a peripheral surface, at least a portion of said peripheral surface being resiliently deformable;

means for mounting said wheel for rotation with said wheel lying at least partially in the path of the articles at the label retaining station;

guide means adjacent said peripheral surface of said wheel for urging an article against the peripheral surface to resiliently deform the peripheral surface sufficiently to hold the article in a desired orientation at the label retaining station;

means for blowing a leading portion of the label on the label retaining means onto the article held in said orientation at the label retaining station while allowing the label retaining means to retain a trailing portion of the label whereby movement of the article past the label retaining station pulls the trailing portion of the label from the label retaining means; and means downstream of said label retaining station for applying the trailing portion of the label to the article.

2. A label applicator as defined in claim 1 wherein said releasable retaining means includes leading and trailing enclosures having leading and trailing perforate face sections, respectively, and means for placing said face sections at a pressure less than atmospheric, and said blowing means supplies a gas at greater than atmospheric pressure through the leading face section.

3. A label applicator as defined in claim 2 wherein said leading face section is concave.

4. A label applicator as defined in claim 1 wherein said releasable retaining means includes a perforate face having a leading portion and a trailing portion and means for placing said face at a pressure less than atmospheric whereby the label is releasably retained on said face by differential pressure, and at least a section of said leading portion of said face is concave.

5. A label applicator as defined in claim 1 wherein said guide means includes a guide for guiding movement of the articles along the path, said guide having an opening therein, and at least a portion of said label retaining means being received in said opening of said guide.

6. A label applicator as defined in claim 3 wherein said applying means rotates the article to apply said trailing portion of the label to the article.

7. A label applicator for labeling articles moved along a path past a label retaining station, said label applicator comprising:

a supporting structure;

means on the supporting structure for releasably retaining a label at the label retaining station;

said releasable retaining means including leading and trailing enclosures having leading and trailing perforate face sections, respectively, and means for placing said leading and trailing face sections at a pressure less than atmospheric;

label dispensing means for dispensing a label onto said leading and trailing face sections whereby the label can be releasably held against the leading and trailing face sections by differential fluid pressure with a leading portion of the label being on the leading face section and a trailing portion of the label being on the trailing face section;

means for supplying a gas at greater than atmospheric pressure through said leading face section to transfer the leading portion of the label from the leading face section to an article at the label retaining station while allowing the trailing portion of the label to remain releasably retained on the trailing face section whereby movement of the article past the label retaining station pulls the trailing portion of the label from the trailing face section; and means downstream of said label retaining station for applying the trailing portion of the label to the article.

8. A label applicator as defined in claim 7 wherein said leading face section is shorter in the general direction of said path than said trailing face section.

9. A label applicator as defined in claim 7 wherein said leading enclosure is smaller than said trailing enclosure.

10. A label applicator as defined in claim 7 including a guide on the supporting structure for guiding movement of the articles along the path, said guide having an opening therein, and at least a portion of said leading enclosure being received in said opening of said guide.

11. A label applicator as defined in claim 7 wherein at least a portion of said leading face section is concave.

12. A label applicator for labeling articles moved along a path past a label retaining station, said label applicator comprising:

a supporting structure;

means on the supporting structure for releasably retaining a label at the label retaining station;

said releasable retaining means including a perforate face having a leading portion and a trailing portion and means for placing said face at a pressure less than atmospheric;

label dispensing means for dispensing a label onto the face of the releasable retaining means whereby the label can be releasably held against the leading portion and the trailing portion of the face by differential fluid pressure with a leading portion of the label being on the leading portion of the face and a trailing portion of the label being on a trailing portion of the face;

means for supplying a gas at greater than atmospheric pressure through said leading portion of said face to transfer the leading portion of the label from said leading portion of the face to an article at the label retaining station while allowing the trailing portion of the label to remain releasably retained on the trailing portion of the face whereby movement of the article past the label retaining station pulls the trailing portion of the label from the trailing portion of the face;

at least a portion of said leading portion of said face being concave whereby the pressure at less than atmospheric pressure from the retaining means is unable to suck the label, which has its leading portion transferred to the article, back against the concave portion so as to prevent the article from pulling the label completely off of the face; and means downstream of the label retaining station for applying the trailing portion of the label to the article.

13. A label applicator as defined in claim 12 wherein said trailing portion of said face is generally planar.

14. A label applicator as defined in claim 12 wherein the concave portion is stationary.

* * * * *